(12) United States Patent
Ishizaki et al.

(10) Patent No.: US 12,480,882 B2
(45) Date of Patent: Nov. 25, 2025

(54) EXHAUST GAS ANALYSIS DEVICE, EXHAUST GAS ANALYSIS METHOD, AND PROGRAM STORAGE MEDIUM FOR EXHAUST GAS ANALYSIS DEVICE

(71) Applicant: HORIBA, LTD., Kyoto (JP)

(72) Inventors: Tomohiko Ishizaki, Kyoto (JP); Tomoshi Yoshimura, Kyoto (JP)

(73) Assignee: HORIBA, LTD. (JP)

( * ) Notice: Subject to any disclaimer, the term of this patent is extended or adjusted under 35 U.S.C. 154(b) by 259 days.

(21) Appl. No.: 18/029,911

(22) PCT Filed: Sep. 22, 2021

(86) PCT No.: PCT/JP2021/034823
§ 371 (c)(1),
(2) Date: Apr. 2, 2023

(87) PCT Pub. No.: WO2022/071066
PCT Pub. Date: Apr. 7, 2022

(65) Prior Publication Data
US 2023/0366827 A1    Nov. 16, 2023

(30) Foreign Application Priority Data

Oct. 2, 2020   (JP) ................. 2020-167674
Nov. 5, 2020   (JP) ................. 2020-185255

(51) Int. Cl.
*G01N 21/76*     (2006.01)
*G01N 1/22*      (2006.01)
(Continued)

(52) U.S. Cl.
CPC ......... *G01N 21/766* (2013.01); *G01N 1/2252* (2013.01); *G01N 1/38* (2013.01); *G01N 33/004* (2013.01); *G01N 2001/386* (2013.01)

(58) Field of Classification Search
CPC ...... G01N 21/766; G01N 1/2252; G01N 1/38; G01N 33/004; G01N 33/0037; G01N 33/006; G01N 21/76; G01N 21/3504
See application file for complete search history.

(56) References Cited

U.S. PATENT DOCUMENTS

| | | |
|---|---|---|
| 6,230,103 B1 | 5/2001 | DeCorso et al. |
| 7,414,726 B1 | 8/2008 | Bambeck |
| | (Continued) | |

FOREIGN PATENT DOCUMENTS

| | | |
|---|---|---|
| CN | 103175799 A | 6/2013 |
| CN | 104048936 A | 9/2014 |
| | (Continued) | |

OTHER PUBLICATIONS

English Machine Translation of Mori, JP 2010-223702 (Year: 2010).*

(Continued)

*Primary Examiner* — David Z Huang
(74) *Attorney, Agent, or Firm* — Brooks Kushman P.C.

(57) ABSTRACT

An exhaust gas analysis device analyzes exhaust gas generated when fuel is combusted. This exhaust gas analysis device includes a first analyzer that measures a concentration of a component to be measured in the exhaust gas, a second analyzer that measures a concentration of $CO_2$ in the exhaust gas, a storage portion that stores a hydrogen/carbon ratio, which is a ratio between hydrogen and carbon composing the fuel, or an input receiving portion that receives an input of the hydrogen/carbon ratio, a moisture concentration estimating portion that, based on the measured $CO_2$ concentration and on the hydrogen/carbon ratio of the fuel, estimates a concentration of moisture in the exhaust gas, and a (Continued)

correcting portion that, based on the estimated moisture concentration, corrects the measured concentration of the component to be measured.

12 Claims, 8 Drawing Sheets

(51) Int. Cl.
*G01N 1/38* (2006.01)
*G01N 33/00* (2006.01)

(56) References Cited

U.S. PATENT DOCUMENTS

| | | | |
|---|---|---|---|
| 8,103,429 | B2 | 1/2012 | Sivasubramaniam et al. |
| 2006/0236752 | A1* | 10/2006 | Nakamura ......... G01N 33/0032 73/23.31 |
| 2008/0147295 | A1 | 6/2008 | Sivasubramaniam et al. |
| 2016/0245193 | A1 | 8/2016 | Makled et al. |

FOREIGN PATENT DOCUMENTS

| | | |
|---|---|---|
| EP | 0681179 A1 | 11/1995 |
| JP | H0843288 A | 2/1996 |
| JP | 10-267885 A | 10/1998 |
| JP | 11-230869 A | 8/1999 |
| JP | 2001-99781 A | 4/2001 |
| JP | 2006-275801 A | 10/2006 |
| JP | 2010223702 A * | 10/2010 |
| JP | 2014-174054 A | 9/2014 |

OTHER PUBLICATIONS

International Search Report dated Nov. 9, 2021 issued for International application No. PCT/JP2021/034823.
EESR dated Sep. 17, 2024 issued in EP patent application No. 21875368.9.
Decision to grant a patent dated Oct. 1, 2024 issued in JP patent application No. 2022-553867.
Office Action dated Sep. 17, 2025 issued in CN patent application No. 202180066838.9.

* cited by examiner

| TYPE OF FUEL USED | H/C | $F_{H2O}$ |
|---|---|---|
| GASOLINE | 1.85 | 0.925 |
| DIESEL | 1.93 | 0.965 |
| ETHANOL (10%) | 1.92 | 0.960 |
| ETHANOL (15%) | 1.95 | 0.975 |
| ETHANOL (85%) | 2.73 | 1.365 |
| ETHANOL (100%) | 3.00 | 1.500 |
| METHANOL (100%) | 4.00 | 2.000 |
| LPG | 2.64 | 1.320 |
| NATURAL GAS | 3.78 | 1.890 |

FIG.3

| TYPE OF FUEL USED | n (H ELEMENT NUMBER) | m (O ELEMENT NUMBER) |
|---|---|---|
| GASOLINE | 1.85 | 0.000 |
| DIESEL | 1.93 | 0.000 |
| ETHANOL (10%) | 1.92 | 0.030 |
| ETHANOL (15%) | 1.95 | 0.050 |
| ETHANOL (85%) | 2.73 | 0.380 |
| ETHANOL (100%) | 3.00 | 0.500 |
| METHANOL (100%) | 4.00 | 1.000 |
| LPG | 2.64 | 0.000 |
| NATURAL GAS | 3.78 | 0.016 |

FIG.7

EXHAUST GAS ANALYSIS DEVICE, EXHAUST GAS ANALYSIS METHOD, AND PROGRAM STORAGE MEDIUM FOR EXHAUST GAS ANALYSIS DEVICE

CROSS-REFERENCE TO RELATED APPLICATIONS

This application is the U.S. national phase of PCT Application No. PCT/JP2021/034823, filed Sep. 22, 2021, which claims priority to Japanese Patent Application No. 2020-167674, filed Oct. 2, 2020, and Japanese Patent Application No. 2020-185255, filed Nov. 5, 2020, the disclosures of which are incorporated in their entireties by reference herein.

TECHNICAL FIELD

The present invention relates to an exhaust gas analysis device that analyzes exhaust gas, and to an exhaust gas analysis method and a program storage medium for an exhaust gas analysis device.

TECHNICAL BACKGROUND

Conventionally, in order to analyze exhaust gas that is emitted, for example, from an automotive vehicle or the like, the concentration of a component to be measured such as $NO_x$ or the like is measured using a variety of gas analyzers. Moisture generated, for example, by the combustion of fuel is contained in this exhaust gas, and it is well known that, if the concentration of a component to be measured such as $NO_x$ or the like in the exhaust is measured using a gas analyzer, then the resulting measurement values contain measurement errors due to interference from this moisture. Because of this, conventionally, the moisture concentration in exhaust gas is measured using, for example, a moisture concentration meter, and the concentration of the component to be measured in the exhaust gas is corrected in accordance with the measured moisture concentration (see, for example, Patent Document 1).

However, when performing calibration of the gas analyzer using the moisture concentration meter, it is necessary to prepare gases having various moisture concentrations, however, the problem arises that it is difficult to accurately generate a gas having a desired moisture concentration, and this makes it difficult to perform the calibration. Moreover, from the standpoints of saving space and reducing costs, there are demands for a structure that makes providing a separate moisture concentration meter unnecessary.

DOCUMENTS OF THE PRIOR ART

Patent Documents

[Patent Document 1] Japanese Unexamined Patent Application (JP-A) No. 2014-174054

DISCLOSURE OF THE INVENTION

Problems to be Solved by the Invention

The present invention was conceived in view of the above-described circumstances, and it is a principal object thereof to provide an exhaust gas analysis device that makes it possible to correct the effects of moisture on a component to be measured in exhaust gas without using a moisture concentration meter.

Means for Solving the Problem

Namely, an exhaust gas analysis device according to the present invention is an exhaust gas analysis device that analyzes exhaust gas generated as a result of fuel being combusted, and that is characterized in having a first analyzer that measures a concentration of a component to be measured in the exhaust gas, a second analyzer that measures a concentration of $CO_2$ in the exhaust gas, a storage portion that stores a hydrogen/carbon ratio, which is a ratio between hydrogen and carbon composing the fuel, or an input receiving portion that receives an input of the hydrogen/carbon ratio (in other words, at least one of the storage portion or the receiving portion), a moisture concentration estimating portion that, based on the measured $CO_2$ concentration and on the hydrogen/carbon ratio of the fuel, estimates a concentration of moisture in the exhaust gas, and a correcting portion that, based on the estimated moisture concentration, corrects the measured concentration of the component to be measured.

If this type of structure is employed, because there is provided the moisture estimating portion that theoretically estimates a concentration of moisture in exhaust gas using a concentration of $CO_2$ in the exhaust gas and a ratio between hydrogen and carbon in the fuel, it is possible to correct the effects of moisture on a component to be measured without directly measuring the moisture concentration using a moisture concentration meter.

An example of an aspect of the exhaust gas analysis device that clearly demonstrates the effects obtained from the present invention is a structure in which the first analyzer measures the concentration of the component to be measured by performing wet measurement, and the second analyzer measures the concentration of $CO_2$ by performing dry measurement.

An example of a specific aspect of the moisture concentration estimating portion is a structure in which the moisture concentration estimating portion estimates the concentration of moisture in the exhaust gas by multiplying the hydrogen/carbon ratio by a wet $CO_2$ concentration which is obtained by converting the $CO_2$ concentration acquired by performing a dry measurement into a wet measurement value, or by performing an equivalent computation.

An example of a specific aspect of the exhaust gas analysis device is a structure in which there is further provided a $CO_2$ concentration converting portion that converts the $CO_2$ concentration acquired by the second analyzer by means of a dry measurement into a wet measurement value based on the hydrogen/carbon ratio, and in which the correcting portion corrects the concentration of the component to be measured using the moisture concentration estimated by the moisture concentration estimating portion, and the $CO_2$ concentration obtained after the conversion performed by the $CO_2$ concentration converting portion.

In order to enable the moisture concentration in the exhaust gas to be estimated even more accurately, it is desirable that the moisture concentration estimating portion be designed to estimate the moisture concentration in the exhaust gas based on the measured $CO_2$ concentration, the hydrogen/carbon ratio of the fuel, a concentration of moisture in the atmosphere, a partial pressure of the $CO_2$ component in the exhaust gas, and a partial pressure of the $H_2O$ component in the exhaust gas.

In order to enable the wet $CO_2$ concentration to be calculated more accurately, it is desirable that the $CO_2$ concentration converting portion convert the $CO_2$ concentration acquired by the second analyzer by means of a dry measurement into a wet measurement value based on the hydrogen/carbon ratio of the fuel, and on the partial pressure of the $CO_2$ component in the exhaust gas.

It is preferable that the exhaust gas analysis device is further provided with a calculating portion that, based at least on composition of the fuel and on a complete combustion mode of the fuel, calculates the respective partial pressures of the $CO_2$ component and the $H_2O$ component in the exhaust gas.

An example of a specific aspect of the component to be measured is $NO_x$. Moreover, an example of a specific aspect of the first analyzer is a CLD-type detector.

Moreover, an exhaust gas analysis method of the present invention is a method of analyzing exhaust gas generated as a result of fuel being combusted, and is characterized in that a concentration of a component to be measured in the exhaust gas is measured, a concentration of $CO_2$ in the exhaust gas is measured, a concentration of moisture in the exhaust gas is estimated based on the measured $CO_2$ concentration and on a hydrogen/carbon ratio, which is a ratio between the hydrogen and the carbon composing the fuel, and the measured concentration of the component to be measured is corrected based on the estimated moisture concentration.

Moreover, a program storage medium for an exhaust gas analysis device of the present invention is a storage medium on which is stored a program for an exhaust gas analysis device that analyzes exhaust gas generated as a result of fuel being combusted, and is provided with a first analyzer that measures a concentration of a component to be measured in the exhaust gas, and a second analyzer that measures a concentration of $CO_2$ in the exhaust gas, and is characterized in causing a computer to perform functions of a storage portion that stores a hydrogen/carbon ratio, which is a ratio between hydrogen and carbon composing the fuel, a moisture concentration estimating portion that, based on the measured $CO_2$ concentration and on the hydrogen/carbon ratio of the fuel, estimates a concentration of moisture in the exhaust gas, and a correcting portion that, based on the estimated moisture concentration, corrects the measured concentration of the component to be measured.

By employing the above-described exhaust gas analysis method and program storage medium for an exhaust gas analysis device, the same type of action and effects can be obtained as those provided by the above-described exhaust gas analysis device.

Effects of the Invention

According to the present invention having the above-described structure, it is possible to provide an exhaust gas analysis device that makes it possible to correct the effects of moisture on a component to be measured in exhaust gas without using a moisture concentration meter.

BRIEF DESCRIPTION OF THE DRAWINGS

FIG. 3 is an example of hydrogen-carbon ratios of each fuel stored in the exhaust gas analysis device of the same embodiment.

FIG. 7 is an example of fuel composition information stored in the exhaust gas analysis device of another embodiment.

DESCRIPTION OF THE REFERENCE NUMERALS

2 . . . Exhaust Gas Analysis Device
21 . . . First Analyzer
22 . . . Second Analyzer
232 . . . Correcting Portion
233 . . . Storage Portion
235 . . . Moisture Concentration Estimating Portion

BEST EMBODIMENTS FOR IMPLEMENTING THE INVENTION

An embodiment of an exhaust gas analysis system that is provided with an exhaust gas analysis device according to the present invention will now be described with reference to the drawings.

An exhaust gas analysis system 100 of the present embodiment is used to measure concentrations of components to be measured that are present in exhaust gas that is generated by the combustion of fuel (for example, gasoline or the like) in an internal combustion engine such as, for example, a vehicle engine or the like, and is then emitted.

Figure 1:
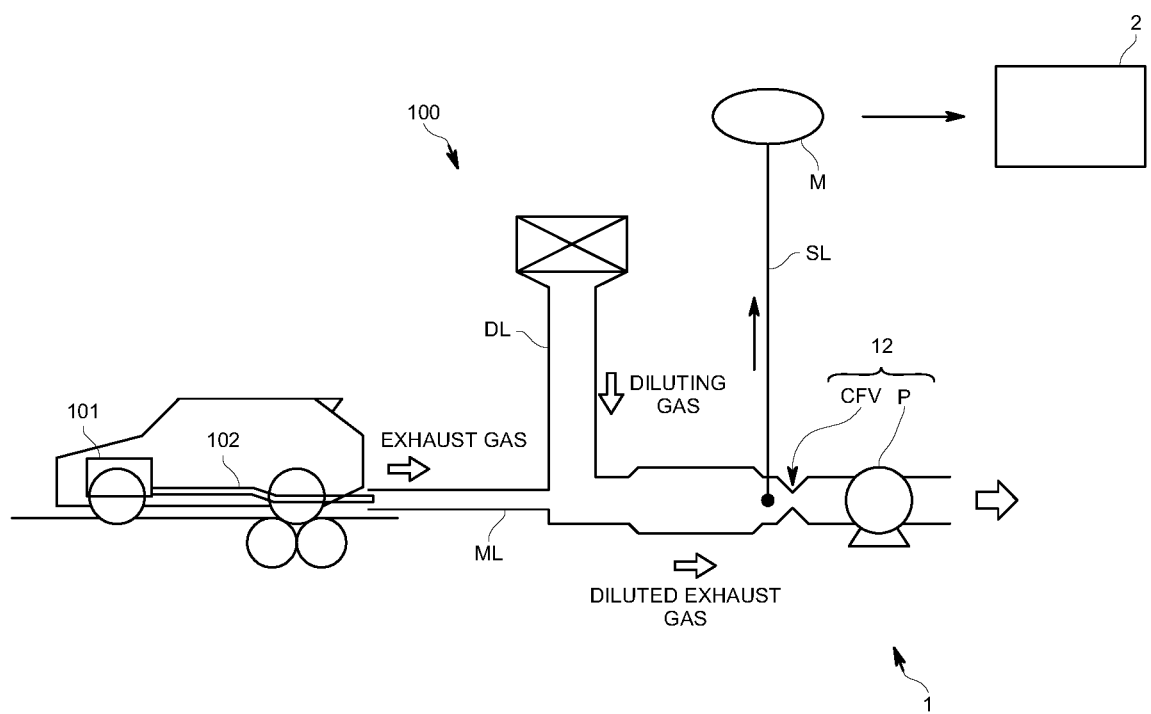
FIG. 1 is a schematic view showing a structure of an exhaust gas analysis system of the present embodiment.

More specifically, as is shown in FIG. 1, the exhaust gas analysis system 100 measures concentrations of components to be measured that are present in exhaust gas emitted from an engine during a mode driving test (such as WLTP mode or JC08 mode) for a vehicle performed using a chassis testing apparatus. Even more specifically, the exhaust gas analysis system 100 is provided with a constant volume sampler (CVS) 1 that is designed to perform total sampling of exhaust gas, and to create diluted exhaust gas by mixing a diluent gas into an exhaust gas that has undergone total sampling in such a way as to cause the flow rate of this diluted exhaust gas to remain constant, a sampling bag M that samples and contains the diluted exhaust gas, and an exhaust gas analysis device 2 that analyzes the diluted exhaust gas contained in the diluted exhaust gas sampling bag, measures the concentrations of the components to be measured that are present in the diluted exhaust gas, and, based on the measurement results, calculates the concentrations of the components to be measured that are present in the exhaust gas.

As is shown in FIG. 1, the CVS 1 is provided with a main flow path ML along which flows the exhaust gas emitted from an exhaust pipe 102 of an internal combustion engine 101, a diluting gas flow path DL that merges with the main flow path ML and along which flows diluting gas that dilutes the exhaust gas, and a flow rate controller 12 that is provided on a downstream side from the merge point where the main flow path ML and the diluting gas flow path DL merge with each other and that performs control so as to maintain the diluted exhaust gas that has been diluted by the diluting gas in a constant flow rate.

As is shown in FIG. 1, the flow rate controller 12 is a critical flow venturi-type device that is formed by a critical flow venturi CFV and a suction pump P. In the present embodiment a single critical flow venturi CFV is provided, however, it is also possible to employ a structure in which the flow rate of the diluted exhaust gas can be altered by providing a plurality of critical flow venturi CFV in parallel and altering the critical flow venturi CFV through which the diluted exhaust gas is flowing using shutoff valves or the like, for example.

In a state in which the total flow rate of the exhaust gas and the diluting gas, in other words, the flow rate of the diluted exhaust gas is being held constant by the above-described CVS 1, a portion of the diluted exhaust gas travels via a diluted exhaust gas sampling flow path SL and is contained in the sampling bag M.

The diluted exhaust gas contained in the sampling bag M (hereinafter, this may be referred to as 'sample gas') is supplied to the exhaust gas analysis device 2, and the concentration of the component to be measured that is contained in the exhaust gas is calculated by the exhaust gas analysis device 2.

Figure 2:
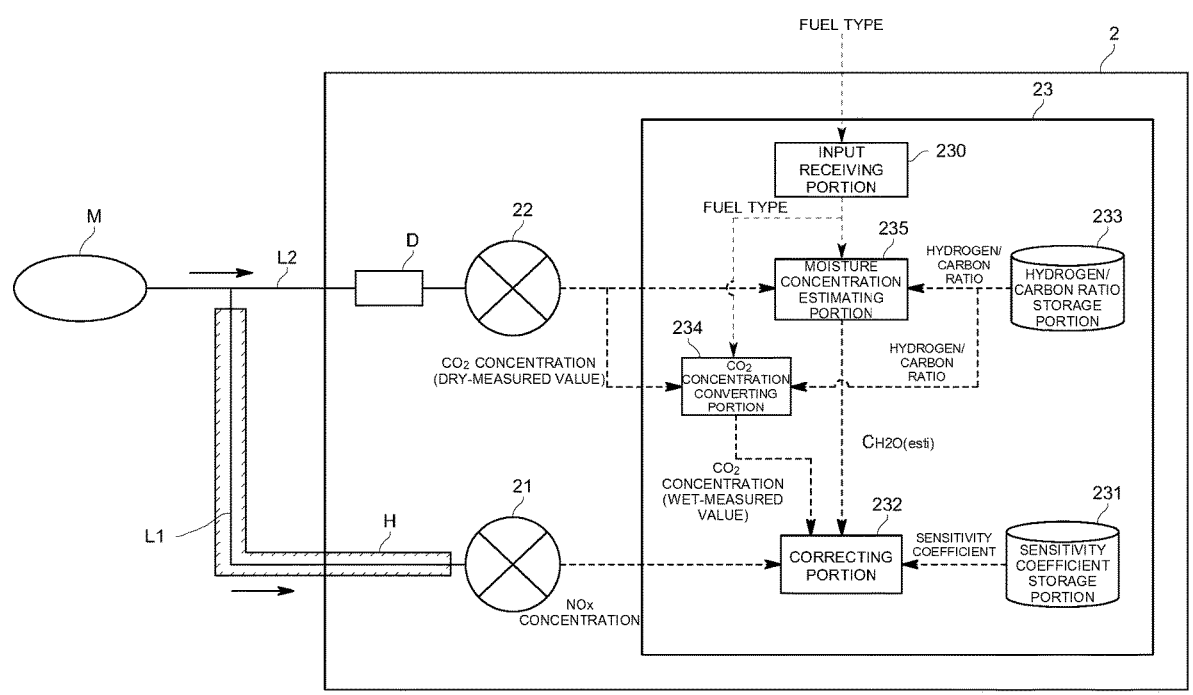
FIG. 2 is a function block diagram showing functions of an exhaust gas analysis device of the same embodiment.

As is shown in FIG. 2, the exhaust gas analysis device 2 is equipped with a first analyzer 21 that measures the concentration of the component to be measured that is contained in the sample gas supplied from the sampling bag M, a second analyzer 22 that measures a concentration of $CO_2$ contained in this same sample gas, and a computational device 23 that corrects the concentration value of the component to be measured that was measured by the first analyzer 21.

Note that, in the present embodiment, the component to be measured is $NO_x$ (NO and $NO_2$).

More specifically, the first analyzer 21 is a CLD-type (i.e., a chemiluminescence detection-type) detector and, in the present embodiment, is designed to perform wet measurement of the NO, contained in the sample gas. More specifically, a heating portion (i.e., a heating block) H that heats the flowing sample gas to a predetermined temperature that is, for example, equal to or higher than the dewpoint temperature is provided on a first intake flow path L1 that introduces the sample gas into the first analyzer 21.

The second analyzer 22 may be any desired device provided that the device is able to measure a $CO_2$ concentration, and examples thereof include NDIR (Non-Dispersive Infrared spectroscopy) detectors and FTIR (Fourier Transform Infrared spectroscopy) detectors and the like.

In the present embodiment, the second analyzer 22 is designed to perform dry measurement of the $CO_2$ concentration contained in the sample gas. More specifically, a moisture concentration adjustment portion D that adjusts the concentration of moisture in the sample gas is provided on a second intake flow path L2 that branches off from the first intake flow path L1 and introduces the sample gas into the second analyzer 22. By altering the temperature of the sample gas so as to maintain a constant moisture concentration, this moisture concentration adjustment portion D lowers the concentration of moisture contained in the sample gas to a set concentration that has been determined in advance. More specifically, a dehumidifier that, for example, dehumidifies the sample gas introduced into the second analyzer 22 by cooling it to the dewpoint temperature or less is used for this moisture concentration adjustment portion D.

The computational device 23 corrects interference effects from other components on the NOR, which is the component to be measured, and is a formed by either a dedicated or general purpose computer that is provided with a CPU, memory, and an AD converter and the like. In addition, as is shown in FIG. 2, as a result of the CPU and peripheral devices thereof operating in mutual collaboration in accordance with an analysis program stored in the memory, the computational device 23 performs the functions of at least a sensitivity coefficient storage portion 231 and a correcting portion 232.

The sensitivity coefficient storage portion 231 is formed in a predetermined area of the memory, and stores sensitivity coefficients that are used to correct effects from other interference components on the NOR. Sensitivity coefficient data showing these sensitivity coefficients is stored in advance in the sensitivity coefficient storage portion 231 either prior to the product being shipped or prior to the product being operated.

More specifically, this sensitivity coefficient shows the effects of each interference component on the sensitivity of the first analyzer 21, and, even more specifically, the sensitivity coefficient shows a relationship between the concentrations of each interference component and relative errors in the sensitivity of the first analyzer 21 in these concentrations. In the present embodiment, the interference components are principal components other than $NO_x$, that are contained in the sample gas, and more specifically, are $CO_2$ and $H_2O$ (this may be referred to below as moisture). The sensitivity coefficient storage portion 231 stores a sensitivity coefficient $K_{CO2}$ of the first analyzer 21 relative to the $CO_2$ concentration, and a sensitivity coefficient $K_{H2O}$ of the first analyzer 21 relative to the moisture concentration.

Using the concentrations of each interference component contained in the sample gas introduced into the first analyzer 21 and the sensitivity coefficients of the first analyzer 21 relative to each interference component, the correcting portion 232 corrects the $NO_x$ concentration in the sample gas that was measured by the first analyzer 21. Using the $CO_2$ concentrations and moisture concentrations in the sample gas introduced into the first analyzer 21 and the sensitivity coefficients $K_{CO2}$ and $K_{H2O}$, the correcting portion 232 corrects the $NO_x$ concentration that was measured by the first analyzer 21 by employing the following Formula (1) or by performing an equivalent computation thereto.

$$NO_{x\_b} = NO_{x\_a} \cdot \frac{1}{1 + [CO_2 \cdot K_{CO_2} + C_{H_2O} \cdot K_{H_2O}]} \quad (1)$$

Here:
$NO_{x\_a}$ is the $NO_x$ concentration (i.e., the $NO_x$ concentration value measured by the first analyzer 21) prior to correction [ppm];
$NO_{x\_b}$ is the $NO_x$ concentration after correction [ppm];
$CO_2$ is the $CO_2$ concentration in the sample gas introduced into the first analyzer 21 and, in this case, is a wet measurement value [ppm]; and
$C_{H2O}$ is the moisture concentration in the sample gas introduced into the first analyzer 21 [ppm].

In this way, in order for the exhaust gas analysis device 2 of the present embodiment to be able to calculate the moisture concentration in the sample gas introduced into the first analyzer 21 without using a moisture concentration meter, as is shown in FIG. 2, the computational device 23 is further provided with functions of an input receiving portion 230, a hydrogen/carbon ratio storage portion 233, a $CO_2$ concentration converting portion 234, and a moisture concentration estimating portion 235.

The input receiving portion 230 receives inputs of information relating to the fuel being used (for example, the type of fuel, the hydrogen/carbon ratio thereof and the like), and outputs these to the $CO_2$ concentration converting portion 234 and the moisture concentration estimating portion 235. The input receiving portion 230 of the present embodiment receives inputs of information relating to the type of fuel that is being used. Note that these items of information are input by a user who is using a predetermined input means such as, for example, a mouse or a keyboard.

The hydrogen/carbon ratio storage portion 233 is formed in a predetermined area of the memory. A hydrogen/carbon ratio, which is a ratio between the hydrogen and the carbon composing the fuel that is being used in the internal combustion engine, and the type of fuel are mutually associated and stored in this hydrogen/carbon ratio storage portion 233. Hydrogen/carbon ratio data showing hydrogen/carbon ratios corresponding to a plurality of types of fuel is stored in advance in the hydrogen/carbon ratio storage portion 233 of the present embodiment either prior to the product being shipped or prior to the product being operated. This hydrogen/carbon ratio data may be saved in a table format such as, for example, a look-up table or the like.

More specifically, as is shown in table form in FIG. 3, the hydrogen/carbon ratios of the respective fuels that are given by this hydrogen/carbon ratio data are ratios H/C of the number of hydrogen atoms (H) relative to the number of carbon atoms (C) that make up each fuel, and ratios $F_{H2O}$ of the number of water molecules ($H_2O$) relative to the number of $CO_2$ molecules generated when it is assumed that each fuel has been completely combusted.

The $CO_2$ concentration converting portion 234 calculates a wet $CO_2$ concentration by converting the $CO_2$ concentration obtained via a dry measurement performed by the second analyzer 22 into a wet measurement value. More specifically, using the $CO_2$ concentration obtained via the dry measurement performed by the second analyzer 22 and the hydrogen/carbon ratios stored in the hydrogen/carbon ratio storage portion 233, the $CO_2$ concentration converting portion 234 calculates the wet $CO_2$ concentration by employing the following Formula (2) or by performing an equivalent computation thereto.

$$CO_{2(wet)} = \frac{CO_{2(dry)}}{1 + \frac{CO_{2(wet)} \cdot F_{H_2O}}{1,000,000}} \quad (2)$$

Here:
$CO_{2\ (wet)}$ is the wet $CO_2$ concentration [ppm];
$CO_{2\ (dry)}$ is the $CO_2$ concentration obtained via a dry measurement performed by the second analyzer 22 [ppm]; and
$F_{H2O}$ is the hydrogen/carbon ratio of the fuel that is used.

The moisture concentration estimating portion 235 estimates the moisture concentration in the sample gas introduced into the first analyzer 21 (hereinafter, this estimated concentration may also be referred to as an estimated moisture concentration). More specifically, using the $CO_2$ concentration measured by the second analyzer 22 and the hydrogen/carbon ratio stored in the hydrogen/carbon ratio storage portion 233, the moisture concentration estimating portion 235 calculates the estimated moisture concentration by employing the following Formula (3) or by performing an equivalent computation thereto. Note that, here, the moisture concentration estimating portion 235 is designed to acquire the hydrogen/carbon ratio of the fuel being used from the hydrogen/carbon ratio storage portion 233 based on information relating to the type of fuel that has been received from the input receiving portion 230.

$$C_{H_2O(esti)} = \frac{CO_{2(dry)} \cdot F_{H_2O}}{1 + \frac{CO_{2(dry)} \cdot F_{H_2O}}{1,000,000}} \quad (3)$$

Here:
$C_{H2O\ (esti)}$ is the estimated moisture concentration [ppm];
$CO_{2\ (dry)}$ is the $CO_2$ concentration obtained via a dry measurement performed by the second analyzer 22 [ppm]; and
$F_{H2O}$ is the hydrogen/carbon ratio of the fuel that is used.

Note that Formula (2) and Formula (3) given above are derived by solving the following Formula (4) which shows a relationship between the hydrogen/carbon ratio of the fuel and the moisture concentration and $CO_2$ concentration in the sample gas that are obtained by combusting this fuel, and by solving the following Formula (5) which converts the $CO_2$ concentration, which is a dry-measurement value, into a wet measurement value based on the moisture concentration.

$$C_{H_2O(esti)} = CO_{2(wet)} \cdot F_{H_2O} \quad (4)$$

$$CO_{2(wet)} = CO_{2(dry)} \cdot \left(1 - \frac{C_{H_2O(esti)}/10,000}{100}\right) \quad (5)$$

Using the estimated moisture concentration calculated by the moisture concentration estimating portion 235 and the wet $CO_2$ concentration calculated by the $CO_2$ concentration converting portion 234, the correcting portion 232 corrects the $NO_x$ concentration measured by the first analyzer 21. In other words, the correcting portion 232 corrects the $NO_x$ concentration using the estimated moisture concentration $C_{H2O\ (esti)}$ as the moisture concentration in Formula (1), and using the wet $CO_2$ concentration $CO_{2\ (wet)}$ as the $CO_2$ concentration.

Figure 4:
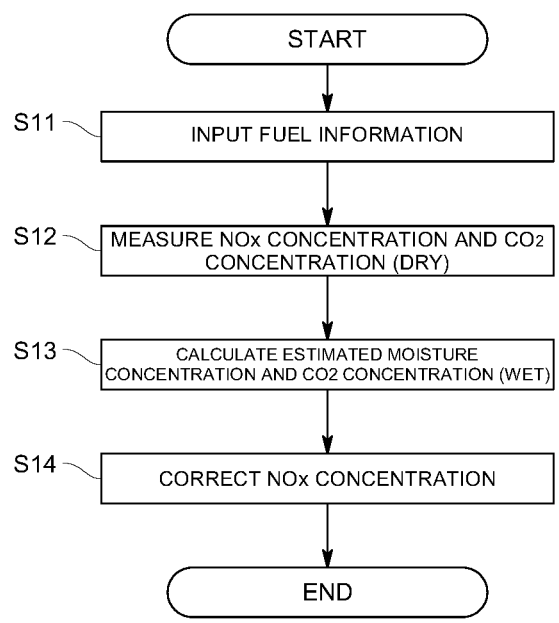
FIG. 4 is a flowchart illustrating an exhaust gas analysis performed using the exhaust gas analysis device of the same embodiment.

Next, an operation of the exhaust gas analysis device 2 of the present embodiment will be described with reference to the flowchart shown in FIG. 4.

Firstly, a user inputs information relating to the fuel used in the vehicle test (i.e., the type of fuel) (step S11). Next, the sample gas contained in the sampling bag M is analyzed by the first analyzer 21 and the second analyzer 22, and the $NO_x$ concentration and the $CO_2$ concentration (i.e., a dry measurement value) in the sample gas are measured (step S12). Based on the $CO_2$ concentration (i.e., a dry measurement value) measured by the second analyzer 22, and on the input hydrogen/carbon ratio corresponding to the fuel type, the moisture concentration estimating portion 235 calculates the estimated moisture concentration contained in the sample gas that has been introduced into the first analyzer 21. Moreover, based on the $CO_2$ concentration (i.e., the dry measurement value) measured by the second analyzer 22, and on the input hydrogen/carbon ratio corresponding to the fuel type, the $CO_2$ concentration converting portion calculates the (wet) $CO_2$ concentration obtained when the dry measurement value is converted into a wet measurement value (step S13). In addition, based on the calculated estimated moisture concentration, the (wet) $CO_2$ concentration, and the sensitivity coefficient, the correcting portion 232 corrects the $NO_x$ concentration calculated by the first analyzer 21 (step S14).

According to the exhaust gas analysis device 2 of the present embodiment that is formed in the above-described manner, because there is provided the moisture concentration estimating portion 235 that theoretically estimates the moisture concentration in exhaust gas using the $CO_2$ concentration in the exhaust gas and the hydrogen/carbon ratio of the fuel, it is possible to correct the effects of moisture on the $NO_x$ concentration measured by the CLD-type detector 21 without directly measuring the moisture concentration using a moisture concentration meter.

Note that the present invention is not limited to the above-described embodiment.

Figure 5:
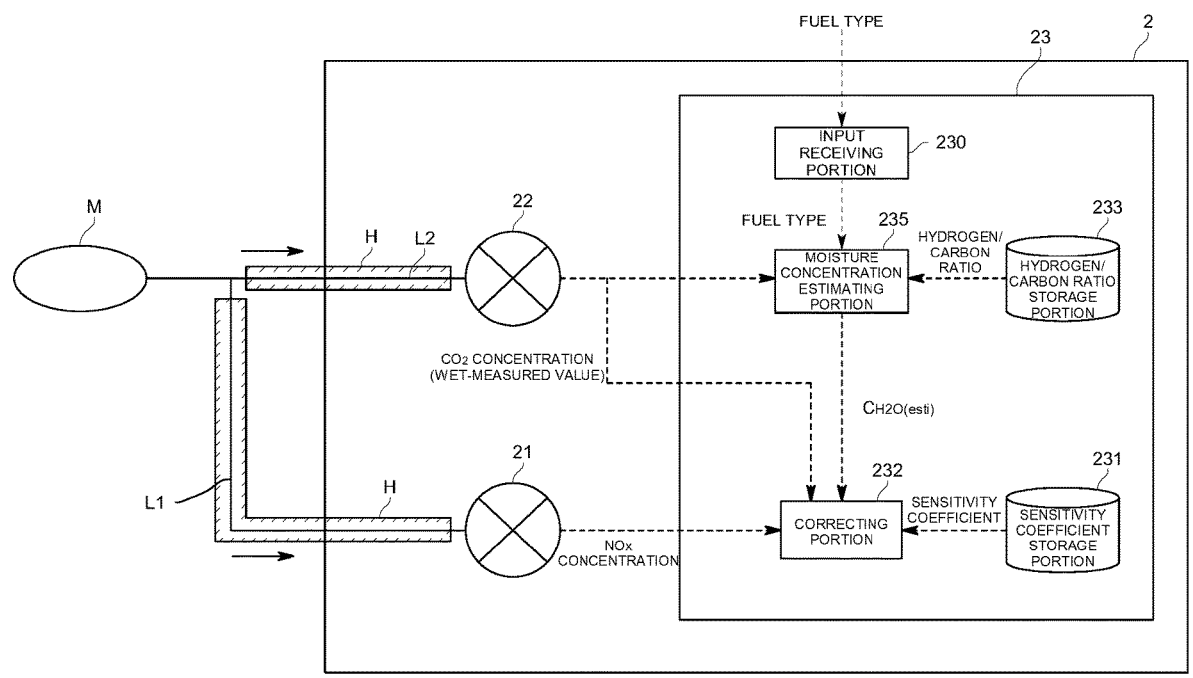
FIG. 5 is a function block diagram showing functions of an exhaust gas analysis device of another embodiment.

For example, as is shown in FIG. 5, it is also possible for the exhaust gas analysis device 2 of another embodiment to be formed in such a way that both the first analyzer 21 and the second analyzer 22 perform wet measurements. In this case, it is not necessary for the exhaust gas analysis device 2 to be provided with the functions of the $CO_2$ concentration converting portion 234. Moreover, it is also possible for the moisture concentration estimating portion 235 to be formed in such a way as to calculate the estimated moisture concentration by implementing the following Formula (6), or by performing an equivalent computation thereto, using the $CO_2$ concentration measured by the second analyzer 22 and the hydrogen/carbon ratio stored in the hydrogen/carbon ratio storage portion 233.

$$C_{H_2O(esti)} = CO_{2(wet)} \cdot F_{H_2O} \tag{6}$$

Here:
$C_{H_2O\ (esti)}$ is the estimated moisture concentration [ppm];
$CO_{2\ (wet)}$ is the $CO_2$ concentration obtained via a wet measurement performed by the second analyzer 22 [ppm]; and
$F_{H_2O}$ is the hydrogen/carbon ratio of the fuel that is used.

In this case, the correcting portion 232 corrects the $NO_x$ concentration measured by the first analyzer 21 using the estimated moisture concentration calculated by the moisture concentration estimating portion 235 and the $CO_2$ concentration that was obtained via wet measurement by the second analyzer 22.

Moreover, the input receiving portion 230 of the above-described embodiment receives inputs of information relating to the fuel type, however, it is also possible for the input receiving portion 230 of another embodiment to be formed in such a way as to receive inputs of information relating to the hydrogen/carbon ratio of the fuel (H/C, $F_{H_2O}$). In this case, it is also possible to employ a structure in which, when the input receiving portion 230 receives information relating to the hydrogen/carbon ratio, it stores this information in the hydrogen/carbon ratio storage portion 233, and the $CO_2$ concentration converting portion 234 and the moisture concentration estimating portion 235 perform the above-described computations by referring to the hydrogen/carbon ratios stored in the hydrogen/carbon ratio storage portion 233.

In the above-described embodiment, the first analyzer 21 is a CLD-type detector, however, it is also possible to employ a detector that utilizes another principle such as an NDIR-type detector, an FID-type detector, an FTIR-type detector, and a QCL-IR-type detector and the like.

In the above-described embodiment, the component to be measured is NOR, however, the component to be measured is not limited to this and it is also possible for other elements such as carbon compounds such as CO, HC, and THC and the like, and for sulfur compounds such as $SO_2$, and $H_2S$ and the like to be used as the component to be measured.

In the above-described embodiment, the exhaust gas analysis system 100 performs the total sampling of the exhaust gas and dilutes the total exhaust gas, however, the present invention is not limited to this. It is also possible for the exhaust gas analysis system 100 of another embodiment to perform the sampling and dilution of only a portion of the exhaust gas.

Moreover, the exhaust gas analysis device 2 of the above-described embodiment analyzes diluted exhaust gas that is obtained by diluting the exhaust gas, however, the present invention is not limited to this. It is also possible for the exhaust gas analysis device 2 of another embodiment to be formed in such a way as to analyze raw exhaust gas that has not been diluted.

In the above-described embodiment, the exhaust gas analysis system 100 measures a component to be measured in exhaust gas that is emitted during a test performed using a chassis testing apparatus, however, the present invention is not limited to this. In another embodiment, it is also possible for the exhaust gas analysis system 100 to measure a component to be measured in exhaust gas that is emitted during a test performed using an engine testing apparatus or a drive testing apparatus such as a power train or the like.

In the above-described embodiment, the exhaust gas analysis system 100 measures a component to be measured in exhaust gas that is emitted from an internal combustion engine such as a vehicle engine or the like, however, the present invention is not limited to this. In another embodiment, it is also possible for the exhaust gas analysis system 100 to measure a component to be measured in exhaust gas that is emitted from an external combustion engine such as a thermal power station or the like or from a factory or the like.

Figure 6:
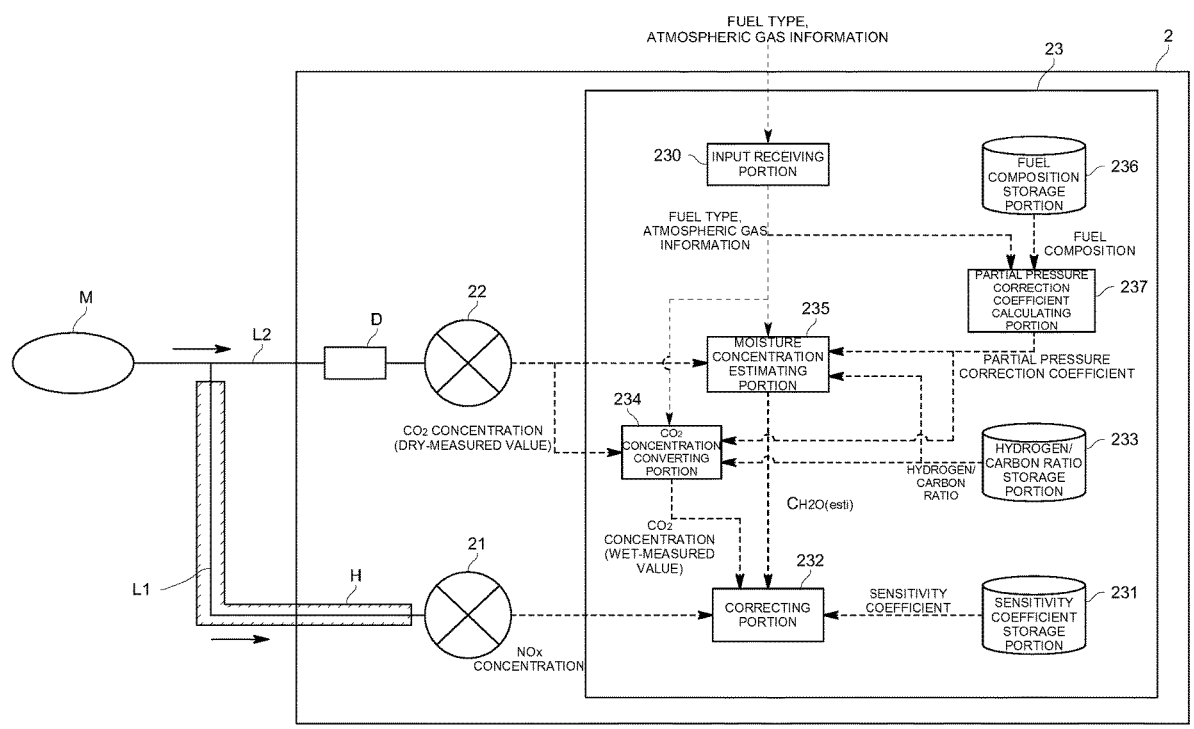
FIG. 6 is a function block diagram showing functions of an exhaust gas analysis device of another embodiment.

Moreover, it is also possible for the exhaust gas analysis system 100 of another embodiment to be provided with a gas sensor (not shown in the drawings) that measures at least the $H_2O$ concentration and the $CO_2$ concentration contained in an atmosphere present in a test environment (such as, for example, a vehicle testing chamber) where vehicle testing is being performed (this may be referred to below as a testing atmosphere). As is shown in FIG. 6, in this case, a structure may be employed in which the exhaust gas analysis device 2 acquires information relating to the measured $H_2O$ concentration and $CO_2$ concentration in the testing atmosphere (i.e., atmospheric gas information), and takes this atmospheric gas information into consideration when correcting the concentration of a component to be measured.

In this case, it is also possible for the computation device 23 to additionally perform the functions of a fuel composition storage portion 236 and a partial pressure correction coefficient calculating portion (referred to as a calculating portion in the claims) 237.

The fuel composition storage portion 236 associates information relating to the composition of the fuel used in the internal combustion engine (this may be referred to below simply as composition information) with the type of fuel, and stores the associated information. More specifically, as is shown in table form in FIG. 7, this composition information shows the number of each element (here, the H element number is n, and the O element number is m) in the chemical formula of each fuel that has been normalized using the C element number. Fuel composition data showing the fuel compositions of a plurality of fuel types is stored in advance in the fuel composition storage portion 236 either prior to the product being shipped or prior to the product being operated. This fuel composition data may be saved in a table format such as, for example, a look-up table or the like.

The partial pressure correction coefficient calculating portion 237 calculates a partial pressure correction coefficient that is used to correct measurement values of the concentrations of various types of gases that have been measured using analyzers and sensors based on the partial pressures thereof (this may be referred to below simply as partial pressure correction). The partial pressure correction coefficient calculating portion 237 of the present embodiment calculates a first partial pressure correction coefficient $\alpha$ that is used to perform partial pressure correction of the $CO_2$ concentration in a sample gas measured by the second analyzer 22, and a second partial pressure correction coefficient $\beta$ that is used to perform partial pressure correction of the $H_2O$ concentration in the testing atmosphere measured by a moisture concentration meter.

The partial pressure correction coefficient is a proportion of the partial pressure of a gas to be corrected in a sample gas relative to a pressure of the testing atmosphere (more specifically, to the atmospheric pressure), and the first partial pressure correction coefficient $\alpha$ and the second partial pressure correction coefficient $\beta$ are expressed respectively by the following Formulas (7) and (8).

$$\alpha = \text{the partial pressure of } CO_2 \text{ in the sample gas/atmospheric pressure} \quad (7)$$

$$\beta = \text{the partial pressure of } H_2O \text{ in the sample gas/atmospheric pressure} \quad (8)$$

The term 'partial pressure of $CO_2$ in the sample gas' refers to the sum total, in the sample gas, of the 'partial pressure deriving from $CO_2$ present in the testing atmosphere' and the 'partial pressure deriving from $CO_2$ generated when the fuel is combusted'. The term 'partial pressure of $H_2O$ in the sample gas' refers to the same principle.

Here, the partial pressure correction coefficient calculating portion 237 calculates the respective partial pressures of the $CO_2$ and $H_2O$ in the sample gas based at least on the information relating to the fuel type that was received by the input receiving portion 230, the composition information stored in the fuel composition storage portion 236, and a complete combustion Formula (9) of the fuel (whose composition is taken as $CH_nO_m$) that takes into consideration gas components in the atmosphere, and then calculates the above-described respective partial pressure correction coefficients $\alpha$ and $\beta$.

$$CH_nO_m + (1 + \tfrac{1}{4}n - \tfrac{1}{2}m) \cdot O_2 + N_2 + Ar + H_2O_{(air)} + CO_{2(air)} \rightarrow CO_{2(comb)} + \tfrac{1}{2}n \cdot H_2O_{(comb)} + N_2 + Ar + H_2O_{(air)} + CO_{2(air)} \quad (9)$$

Here:
$CH_nO_m$ is the fuel;
$H_2O$ (air) is the $H_2O$ component in the testing atmosphere;
$CO_2$ (air) is the $CO_2$ component in the testing atmosphere;
$CO_2$ (comb) is the $CO_2$ component generated by combustion; and
$H_2O$ (comb) is the $H_2O$ component generated by combustion.

Furthermore, in this embodiment, it is also possible for the $CO_2$ concentration converting portion 234 to calculate the wet $CO_2$ concentration by employing the following Formula (10), or by performing an equivalent computation thereto, using the first partial pressure correction coefficient $\alpha$ calculated by the partial pressure correction coefficient calculating portion 237 in addition to using the $CO_2$ concentration obtained via a dry measurement performed by the second analyzer 22 and the hydrogen/carbon ratios stored in the hydrogen/carbon ratio storage portion 233.

$$CO_{2(wet)} = \frac{\alpha \cdot CO_{2(dry)}}{1 + \dfrac{\omega CO_{2(dry)} \cdot F_{H_2O}}{1{,}000{,}000}} \quad (10)$$

Here:
$CO_{2\ (wet)}$ is the wet $CO_2$ concentration [ppm];
$CO_{2\ (dry)}$ is the $CO_2$ concentration obtained via a dry measurement performed by the second analyzer 22 [ppm];
$F_{H2O}$ is the hydrogen/carbon ratio of the fuel that is used; and
$\alpha$ is the first partial pressure correction coefficient.

Moreover, in this embodiment, it is also possible for the moisture concentration estimating portion 235 to calculate the estimated moisture concentration by employing the following Formula (11), or by performing an equivalent computation thereto, using the measured $H_2O$ concentration in the testing atmosphere and also using the first partial pressure correction coefficient $\alpha$ and second partial pressure correction coefficient $\beta$ calculated by the partial pressure correction coefficient calculating portion 237 in addition to using the $CO_2$ concentration measured by the second analyzer 22 and the hydrogen/carbon ratios stored in the hydrogen/carbon ratio storage portion 233.

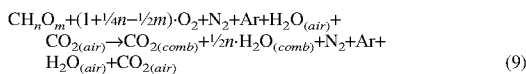

Here:
$C_{H2O\ (esti)}$ is the estimated moisture concentration [ppm];
$CO_{2\ (dry)}$ is the $CO_2$ concentration obtained via a dry measurement performed by the second analyzer 22 [ppm];
$F_{H2O}$ is the hydrogen/carbon ratio of the fuel that is used; and
H is the $H_2O$ concentration in the testing atmosphere [ppm];
$\alpha$ is the first partial pressure correction coefficient; and
$\beta$ is the second partial pressure coefficient.

It is also possible for the correcting portion 232 to correct the $NO_x$ concentration in the sample gas measured by the first analyzer 21 using the estimated moisture concentration and the wet $CO_2$ concentration calculated in the above-described manner.

Moreover, in another embodiment, in a case in which an EGR (Exhaust Gas Recirculation) system is mounted in the test vehicle, then it is also possible for the exhaust gas analysis device 2 to acquire information relating to the EGR rate from the ECU in the test vehicle, and for the partial pressure correction coefficient calculating portion 237 to calculate the first partial pressure correction coefficient $\alpha$ and the second partial pressure correction coefficient $\beta$ using the acquired information relating to the EGR rate.

Figure 8:
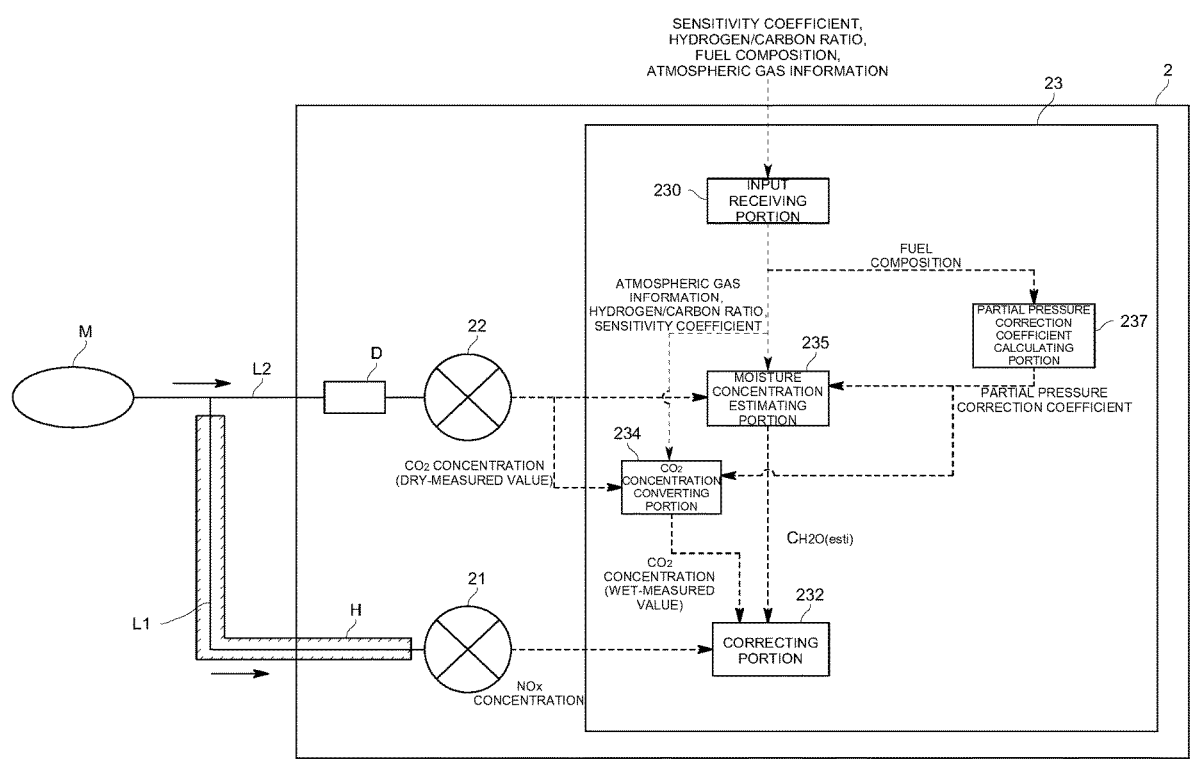
FIG. 8 is a function block diagram showing functions of an exhaust gas analysis device of another embodiment.

Furthermore, the exhaust gas analysis device 2 of the above-described embodiment is provided with the functions of the sensitivity coefficient storage portion 231, the hydrogen/carbon ratio storage portion 233, and the fuel composition storage portion 236, however, the present invention is not limited to this. As is shown in FIG. 8, it is also possible for the exhaust gas analysis device 2 of another embodiment to not be provided with the functions of these storage portions. In this case, a structure may be employed in which the input receiving portion 230 receives inputs of information relating to the sensitivity coefficient, the hydrogen/carbon ratio, and the fuel composition, and then outputs this information to the correcting portion 232, the $CO_2$ concentration converting portion 234, the moisture concentration estimating portion 235, and the partial pressure correction coefficient calculating portion 237.

In addition, it should be understood that the above-described embodiment is exemplary of the invention and is not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

INDUSTRIAL APPLICABILITY

According to the exhaust gas analysis device of the present invention, it possible to correct the effects of moisture on a component to be measured in exhaust gas without using a moisture concentration meter.

What is claimed is:

1. An exhaust gas analysis device that analyzes exhaust gas generated as a result of fuel being combusted comprising:
   a first analyzer that measures a concentration of a component to be measured in the exhaust gas;
   a second analyzer that measures a concentration of $CO_2$ in the exhaust gas;
   a storage portion that stores a hydrogen/carbon ratio, which is a ratio between hydrogen and carbon composing the fuel, or an input receiving portion that receives an input of the hydrogen/carbon ratio;
   a moisture concentration estimating portion that, based on the concentration of $CO_2$ and on the hydrogen/carbon ratio of the fuel, estimates a concentration of moisture in the exhaust gas; and
   a correcting portion that, based on the concentration of moisture and a sensitivity coefficient that shows a relationship between the concentration of moisture and a sensitivity of the first analyzer, corrects effects of moisture on the concentration of the component to be measured.

2. The exhaust gas analysis device according to claim 1, wherein the first analyzer measures the concentration of the component to be measured by performing wet measurement, and the second analyzer measures the concentration of $CO_2$ by performing dry measurement.

3. The exhaust gas analysis device according to claim 2 wherein the moisture concentration estimating portion estimates the concentration of moisture in the exhaust gas by multiplying the hydrogen/carbon ratio by a wet $CO_2$ concentration that is obtained by converting the concentration of $CO_2$ acquired by performing a dry measurement into a wet measurement value.

4. The exhaust gas analysis device according to claim 2, wherein the exhaust gas analysis device further comprises a $CO_2$ concentration converting portion that converts the concentration of $CO_2$ acquired by the second analyzer by means of a dry measurement into a wet measurement value based on the hydrogen/carbon ratio, and
   the correcting portion corrects the concentration of the component to be measured using the concentration of moisture estimated by the moisture concentration estimating portion, and the concentration of $CO_2$ obtained after the conversion performed by the $CO_2$ concentration converting portion.

5. The exhaust gas analysis device according to claim 4, wherein the $CO_2$ concentration converting portion converts the concentration of $CO_2$ acquired by the second analyzer by means of a dry measurement into a wet measurement value based on the hydrogen/carbon ratio of the fuel, and on a partial pressure of a $CO_2$ component in the exhaust gas.

6. The exhaust gas analysis device according to claim 4, wherein the moisture concentration estimating portion estimates the moisture concentration in the exhaust gas based on the concentration of $CO_2$, the hydrogen/carbon ratio of the fuel, a concentration of moisture in atmosphere, a partial pressure of a $CO_2$ component in the exhaust gas, and a partial pressure of an $H_2O$ component in the exhaust gas.

7. The exhaust gas analysis device according to claim 1, wherein the moisture concentration estimating portion estimates the moisture concentration in the exhaust gas based on the concentration of $CO_2$, the hydrogen/carbon ratio of the fuel, a concentration of moisture in atmosphere, a partial pressure of a $CO_2$ component in the exhaust gas, and a partial pressure of an $H_2O$ component in the exhaust gas.

8. The exhaust gas analysis device according to claim 7, wherein the exhaust gas analysis device further comprises a calculating portion that, based at least on composition of the fuel and on a complete combustion mode of the fuel, calculates the respective partial pressures of the $CO_2$ component and the $H_2O$ component in the exhaust gas.

9. The exhaust gas analysis device according to claim 1, wherein the component to be measured is $NO_x$.

10. The exhaust gas analysis device according to claim 9, wherein the first analyzer is a chemiluminescence detector.

11. An exhaust gas analysis method that is employed to analyze exhaust gas generated as a result of fuel being combusted in which:
    a concentration of a component to be measured in the exhaust gas is measured by a first analyzer;
    a concentration of $CO_2$ in the exhaust gas is measured;
    a concentration of moisture in the exhaust gas is estimated based on the concentration of $CO_2$ and on a ratio between hydrogen and carbon composing the fuel; and
    effects of moisture on the concentration of the component to be measured are corrected based on the concentration of moisture and a sensitivity coefficient that shows a relationship between the concentration of moisture and a sensitivity of the first analyzer.

12. A non-transitory computer-readable storage medium containing instructions for a program for an exhaust gas analysis device that analyzes exhaust gas generated as a result of fuel being combusted and comprises a first analyzer that measures a concentration of a component to be measured in the exhaust gas, and a second analyzer that measures a concentration of $CO_2$ in the exhaust gas, wherein the instructions when executed by a computer cause the computer to perform functions of:
    a storage portion that stores a hydrogen/carbon ratio, which is a ratio between hydrogen and carbon composing the fuel;
    a moisture concentration estimating portion that, based on the concentration of $CO_2$ and on the hydrogen/carbon ratio of the fuel, estimates a concentration of moisture in the exhaust gas; and
    a correcting portion that, based on the concentration of moisture and a sensitivity coefficient that shows a relationship between the moisture concentration and a sensitivity of the first analyzer, corrects effects of moisture on the concentration of the component to be measured.

\* \* \* \* \*